United States Patent
Schlarman et al.

(10) Patent No.: US 10,227,929 B2
(45) Date of Patent: Mar. 12, 2019

(54) FLOW LIMITING DUCT VENT VALVES AND GAS TURBINE ENGINE BLEED AIR SYSTEMS INCLUDING THE SAME

(71) Applicant: HONEYWELL INTERNATIONAL INC., Morris Plains, NJ (US)

(72) Inventors: Chris Schlarman, Chandler, AZ (US); Adriel Reavis, Phoenix, AZ (US); Raul Velasquez, El Mirage, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 667 days.

(21) Appl. No.: 14/881,562

(22) Filed: Oct. 13, 2015

(65) Prior Publication Data

US 2017/0101937 A1    Apr. 13, 2017

(51) Int. Cl.
| | |
|---|---|
| *F02C 9/18* | (2006.01) |
| *F02C 3/04* | (2006.01) |
| *F16K 15/02* | (2006.01) |
| *F02C 6/08* | (2006.01) |
| *F16K 17/04* | (2006.01) |
| *F16K 17/30* | (2006.01) |

(52) U.S. Cl.
CPC .................. *F02C 9/18* (2013.01); *F02C 3/04* (2013.01); *F02C 6/08* (2013.01); *F16K 15/026* (2013.01); *F16K 17/044* (2013.01); *F16K 17/30* (2013.01); *F05D 2220/32* (2013.01)

(58) Field of Classification Search
CPC ...... F02C 9/18; F02C 3/04; F02C 6/08; F16K 15/026; F16K 17/044; F16K 17/34; F16K 31/385; F16K 1/126; F16K 11/044; F05D 2220/32; F02K 3/075; G05D 7/014; G05D 7/03; B64D 13/06; B64D 13/08; B64D 15/02; B64D 15/04; F04D 27/0215
USPC ............................................................ 60/785
See application file for complete search history.

(56) References Cited

U.S. PATENT DOCUMENTS

| | | | | |
|---|---|---|---|---|
| 3,122,162 | A * | 2/1964 | Sands | F16K 17/30 137/498 |
| 4,174,731 | A * | 11/1979 | Sturgis | F16K 17/26 137/498 |
| 4,842,198 | A * | 6/1989 | Chang | A01G 25/16 137/514.3 |
| 5,063,963 | A | 11/1991 | Smith | |
| 6,129,309 | A | 10/2000 | Smith et al. | |
| 6,189,324 | B1 * | 2/2001 | Williams | B64D 13/06 62/172 |

(Continued)

Primary Examiner — Loren Edwards
(74) Attorney, Agent, or Firm — Lorenz & Kopf, LLP

(57) ABSTRACT

Embodiments of a flow limiting duct vent valve (DVV) are provided, as are embodiments of a bleed air system including a flow limiting DVV. In one embodiment, the bleed air system a flow limiting DVV and a first valved device, such as a high pressure regulator. The DVV includes, in turn, a housing assembly having an inlet and an outlet. The inlet is fluidly coupled to the valved device when the bleed air system is installed on a gas turbine engine. A valve element is mounted in the housing assembly and, during operation of the DVV, moves from: (i) the closed position to an open vent position when the pressure differential across the valve element exceeds a first threshold, and (ii) from the open vent position to an overpressure shutoff position when the pressure differential across the valve element exceeds a second threshold greater than the first threshold.

17 Claims, 4 Drawing Sheets

(56) References Cited

U.S. PATENT DOCUMENTS

| | | |
|---|---|---|
| 6,536,714 B2 | 3/2003 | Gleine et al. |
| 7,246,482 B2 | 7/2007 | Mahoney et al. |
| 7,618,008 B2 | 11/2009 | Scherer et al. |
| 8,015,838 B2 | 9/2011 | Lippold et al. |
| 8,033,118 B2 | 10/2011 | Monteiro et al. |
| 8,397,487 B2 | 3/2013 | Sennoun et al. |
| 8,516,826 B2 | 8/2013 | Rostek et al. |
| 8,529,189 B2 | 9/2013 | Brown et al. |
| 8,661,833 B2 | 3/2014 | Army |
| 8,696,196 B2 | 4/2014 | Monteiro |
| 8,881,991 B2 | 11/2014 | Buhring |
| 8,967,528 B2 | 3/2015 | Mackin et al. |
| 9,062,604 B2 | 6/2015 | DeFrancesco |
| 2012/0045317 A1 | 2/2012 | Saladino |
| 2015/0251766 A1 | 9/2015 | Atkey |

\* cited by examiner

FLOW LIMITING DUCT VENT VALVES AND GAS TURBINE ENGINE BLEED AIR SYSTEMS INCLUDING THE SAME

TECHNICAL FIELD

The present invention relates generally to gas turbine engines and, more particularly, to gas turbine engine bleed air systems including duct vent valves, which provide an overpressure shutoff functionality.

BACKGROUND

Gas Turbine Engines (GTEs) deployed onboard aircraft (A/C) are often equipped with Bleed Air Systems (BASs). During operation, a BAS extracts bleed air from the GTE's compressor section and prepares the airflow for usage by other "end user" systems onboard the A/C. The hot, pressurized bleed air can be utilized for any number of purposes, such as cabin pressurization and heating areas of the A/C susceptible to icing (e.g., the A/C wings and the GTE intake). Bleed air may be extracted through multiple BAS ports located at different stages of the compressor section including, for example, a mid stage bleed port and a high stage bleed port. Ducting connects the BAS ports to a number of valves or valved devices, which are modulated during BAS operation to regulate the pressure and flow rate of the bleed air in accordance with A/C demands and desired operational parameters. For example, in one known system architecture, a high pressure regulator and a secondary regulator are positioned in flow series downstream of a high stage bleed port; while a mid stage bleed port is fluidly coupled to the outlet of the high pressure regulator and the inlet of the secondary regulator by a bifurcated duct commonly referred to as a "Y-duct."

A certain amount of leakage can occur across the high pressure regulator when closed due to the significant pressures and temperatures of the bleed air extracted through the high stage bleed port. When the secondary regulator is also closed, such leakage can potentially result in an undesirable pressure build-up within the Y-duct connecting the high pressure regulator to the secondary regulator. To prevent such pressure build-up, the BAS can be further equipped with a specialized valve referred to as a "duct vent valve." The duct vent valve may normally remain in a closed position and automatically open at high duct pressures (specifically, when a sufficiently large pressure differential develops across the vent valve) to vent bleed air from the Y-duct to a source of low pressure, such as the ambient environment. In so doing, the duct vent valve provides selective pressure relief to prevent the BAS duct pressures from becoming undesirably high despite leakage across the high pressure regulator, providing that such leakage remains within acceptable levels.

BRIEF SUMMARY

Embodiments of a gas turbine engine bleed air system including a flow limiting duct vent valve (DVV) are provided. In one embodiment, the bleed air system contains a flow limiting DVV and a first valved device, such as a high pressure regulator. The flow limiting DVV includes, in turn, a housing assembly having an inlet and an outlet. The inlet is fluidly coupled to the high pressure regulator when the bleed air system is installed on the gas turbine engine. A valve element is movably mounted in the housing assembly and normally resides in (e.g., is resiliently biased toward) a closed position. During operation of the flow limiting DVV, the valve element moves from: (i) the closed position to an open vent position when the pressure differential across the valve element exceeds a first threshold, and (ii) from the open vent position to an overpressure shutoff position when the pressure differential across the valve element exceeds a second threshold greater than the first threshold.

In another embodiment, the bleed air system includes a high pressure regulator, a secondary regulator, and a duct fluidly coupling an outlet of the high pressure regulator to an inlet of the secondary regulator when the bleed air system is installed on a gas turbine engine. A flow limiting DVV is further fluidly coupled to the duct when the bleed air system is installed on a gas turbine engine. The flow limiting DVV is configured to vent airflow from the duct to a low pressure source when the pressure differential across the flow limiting DVV exceeds a first threshold, and to cease venting airflow from the duct when the pressure differential across the flow limiting DVV exceeds a second threshold greater than the first threshold.

Embodiments of a flow limiting DVV are further provided, which are suitable for usage within a bleed air system including a high pressure regulator or other valved device. In one embodiment, the flow limiting DVV includes a housing assembly having an inlet and an outlet. A valve element is slidably mounted in the housing assembly and normally resides in a closed position. The valve element moves from: (i) the closed position to an open vent position when the pressure differential across the valve element surpasses a first threshold, and (ii) from the open vent position to an overpressure shutoff position when the pressure differential across the valve element surpasses a second threshold greater than the first threshold.

BRIEF DESCRIPTION OF THE DRAWINGS

At least one example of the present invention will hereinafter be described in conjunction with the following figures, wherein like numerals denote like elements, and.

DETAILED DESCRIPTION

Figure 1:
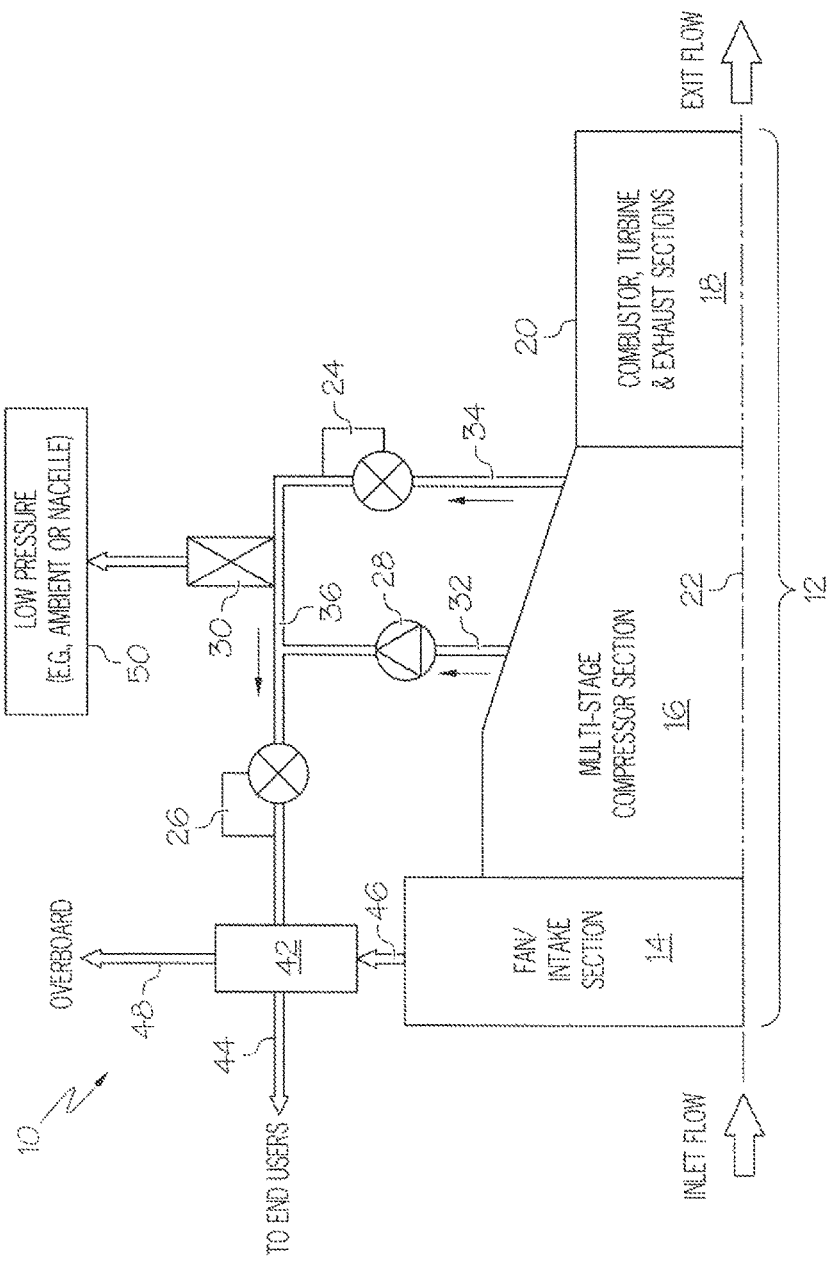
FIG. 1 is schematic illustrating a bleed air system including a flow limiting duct vent valve and installed on a gas turbine engine, as illustrated in accordance with an exemplary embodiment of the present invention.

The following Detailed Description is merely exemplary in nature and is not intended to limit the invention or the application and uses of the invention. Furthermore, there is no intention to be bound by any theory presented in the preceding Background or the following Detailed Description.

As indicated in the foregoing section entitled "BACKGROUND," a Bleed Air System (BAS) is usefully equipped with a Duct Vent Valve (DVV) to prevent BAS duct pressures from becoming undesirably high in the presence of leakage across a high pressure regulator. As conventionally designed and implemented, DVVs are effective at providing this key functionality. This notwithstanding, the present inventors have identified certain limitations associated with conventional DVVs and the larger BASs in which such DVVs are employed. A DVVs is typically designed to open at a relatively low duct pressure and, therefore, at a relatively low pressure differential across the DVV. As a corollary, the DVV may be easily overpowered when exposed to elevated bleed air leakage levels across the high pressure regulator, as may occur in certain fault scenarios. In such instances, the DVV may open and provide a substantially unimpeded flow path to the ambient environment, the interior of the nacelle, or another low pressure source. Undesirably high quantities of bleed air may be continually drawn from the Gas Turbine Engine (GTE) compressor section only to be discharged directly overboard without usage. The energy content of the aircraft (A/C) and the overall efficiency of the GTE may be reduced as a result. Additionally, the rapid outflow of the hot, pressurized bleed air through the BAS subjects the high pressure regulator and other BAS components to considerable heat loading and pronounced thermal cycling, which may decrease the serviceable lifespan and reliability of these components. As a further negative outcome, the open DVV may provide limited pressure relief under such fault conditions thereby partially reducing the BAS duct pressure by an amount sufficient to render detection of the underlying fault less likely.

The following describes embodiments of a BAS included within a GTE and containing a flow limiting DVV, which overcomes the above-described limitations associated within conventional DVVs. At lower duct pressures, the flow limiting DVV automatically opens to vent pressurized bleed air from a BAS duct (e.g., a Y-duct connecting a high pressure regulator to a secondary regulator) in much the same manner as does a conventional DVV. However, in contrast to conventional DVVs, the flow limiting DVV also automatically closes to interrupt venting at higher duct pressures at which it is evident that a fault or other unexpected event has rendered the BAS incapable of adequately regulating the BAS duct pressure. Imparting the flow limiting DVV with such a pressure-actuated shutoff functionality provides several advantages. GTE efficiency is improved by preventing or at least reducing the continual parasitic extraction of hot, pressurized air from the GTE compressor section should the leakage across the high pressure regulator (or another valve upstream of the DVV) become undesirably high. Heat exposure of the high pressure regulator and downstream components (e.g., precoolers) is reduced prolonging the service life and enhancing the reliability of these components. As a further advantage, the overpressure shutoff of the flow limiting DVV may aid in the identification and diagnosis of BAS system faults. Specifically, the overpressure shutoff of the flow limiting DVV will typically result in a moderate spike in BAS duct pressure, which serves as a distinct "hard fault" signal. Such a hard fault signal is readily detectable by pressure sensors included within the BAS enabling the fault to be flagged and later addressed by maintenance. This is a significant advantage as compared to conventional DVVs lacking such an overpressure shutoff function, which may otherwise remain open in the presence of such highly elevated BAS duct pressures and mask the system fault.

FIG. 1 is a schematic of a BAS 10 utilized within a GTE 12, as illustrated in an exemplary embodiment of the present invention. In this particular example, GTE 12 assumes the form of a turbofan engine including a fan-containing take section 14, a multi-stage compressor section 16, and other GTE sections 18 downstream of compressor section 16; i.e., combustor, turbine, and exhaust sections collectively referred to hereafter as "downstream-of-compressor sections 18." Intake section 14, compressor section 16, and downstream-of-compressor sections 18 are disposed within an engine housing or case 20, which is generally axisymmetric about the rotational axis or centerline 22 of GTE 12. As shown in FIG. 1 and described below, GTE 12 is a propulsive engine carried by an A/C. This notwithstanding, GTE 12 is provided by way of non-limiting example only. It will be understood that BAS 10 can be integrated into various other types of propulsive gas turbine engines including turbojet, turboprop, and turboshaft engines; as well as non-propulsive gas turbine engines, such as Auxiliary Power Units (APUs), in further embodiments.

During operation of GTE 12, air is drawn into fan-containing intake section 14 and supplied to multi-stage compressor section 16 for compression. Compressor section 16 includes multiple axial and/or radial compressor stages positioned in succession. Bladed rotors within compressor section 16 rotate to compress the air increasing the pressure and temperature of the airflow to highly elevated levels. The hot, pressurized airflow is then discharged by compressor section 16 and supplied to a combustion section included within downstream-of-compressor sections 18. Within the combustion section, the compressed airflow is mixed with fuel and ignited to generate combustive gasses, which are expanded through one or more turbines contained within the turbine section of GTE 12. The rotation of the turbines drives further rotation of the bladed rotors within compressor section 16 and the fan within intake section 14, as well as generate power, which may be extracted from GTE 12 in various different forms. The combustive gasses may then be exhausted from GTE 12 and utilized to generate thrust in embodiments wherein GTE 12 assumes the form of a turbofan, turbojet, or turboprop engine.

In the exemplary embodiment schematically shown in FIG. 1, BAS 10 includes four valves or valved devices: (i) a high pressure regulator 24, (ii) a secondary regulator 26, (iii) a check valve 28, and (iv) a flow limiting DVV 30. These components are fluidly interconnected by a network of flow lines or ducts 32, 34, and 36. Specifically, a first duct 32 fluidly couples the inlet of high pressure regulator 24 to a high stage bleed port 38, which extracts bleed air from the final or a near final stage of compressor section 16 during operation of GTE 12. Similarly, a second duct 34 fluidly couples the inlet of check valve 28 to a mid stage bleed port 40, which extracts bleed air from a middle or intermediate stage of compressor section 16 during GTE operation. Finally, a third duct 36 fluidly couples the respective outlets of high pressure regulator 24 and check valve 28 to the inlet of secondary regulator 26. Duct 36 is bifurcated to allow connection to the outlets of both high pressure regulator 24 and check valve 28; consequently, duct 36 may be referred to hereafter as "Y-duct 36." In further embodiments, BAS 10 can include other valved devices in addition to or in lieu of those shown in FIG. 1 and described herein.

BAS 10 can include various other components beyond those listed above. For example, BAS 10 may further include a precooler 42, which is fluidly coupled between an outlet of secondary regulator 26 and an outlet of BAS 10 (schematically represented in FIG. 1 by arrow 44). Precooler 42 functions as a heat exchanger allowing heat removal from the relatively hot bleed air discharged by secondary regulator 26 prior delivery to the "end user" devices or systems downstream of BAS 10. The heat removed from the bleed air may be transferred to any suitable cooling fluid directed through precooler 42. For example, as indicated in FIG. 1 by arrow 46, relatively cool airflow can be drawn from fan-containing intake section 14 and passed through precooler 42 to conductively remove heat from the bleed air discharged by secondary regulator 26 prior to delivery to the end user devices. The cooling air discharged from precooler 42 can then be utilized for another purpose onboard the A/C or vented overboard, as indicated in FIG. 1 by arrow 48.

During operation of BAS 10, high pressure regulator 24 and secondary regulator 26 are modulated, whether automatically by changes in air pressure or in response to commands issued by a non-illustrated controller associated within BAS 10, to regulate bleed air pressure and flow rate in accordance with A/C demands and desired operational parameters. Ideally, little to no bleed airflow occurs through Y-duct 36 when both high pressure regulator 24 and secondary regulator 26 are closed. In practice, however, it can be difficult to wholly prevent leakage across high pressure regulator 24 when closed due, at least in part, to the highly elevated temperatures and pressures of the airflow extracted from compressor section 16 through high stage bleed port 38. As previously described, bleed air leakage across high pressure regulator 24 can result in undesirable pressure build-up within Y-duct 36 when regulators 24 and 26 are both closed. Flow limiting DVV 30 is thus placed in Y-duct 36 (and, therefore, fluidly coupled between the outlet of regulator 24 and the inlet of regulator 26) to selectively vent airflow from Y-duct 36 to a low pressure source 50 in the presence of high duct pressures. Specifically, flow limiting DVV 30 vents airflow form Y-duct 36 to low pressure source 50 when the pressure differential across poppet 64 surpasses a first predetermined threshold. Low pressure source 50 can be the ambient environment, the interior of a nacelle surrounding GTE 12 (not shown), or any other region containing an air pressure lower the pressure at which venting of Y-duct 36 occurs.

Flow limiting DVV 30 further provides a unique overpressure shutoff functionality in addition to the above-described duct venting or pressure relief functionality. When the pressure differential across poppet 64 surpasses a second threshold greater than first threshold at which venting occurs, flow limiting DVV 30 automatically closes to prevent or at least substantially impede further venting of pressurized air from Y-duct 36. This is desirable in instances wherein BAS 10 has failed to control the pressure within Y-duct 36 due to, for example, the occurrence of a fault hindering pressure regulator operation. In this instance, flow limiting DVV 30 automatically closes or shuts-off in response to increasing pressure differential across DVV 30 (and, more accurately, the valve element contained therein) resulting from the higher duct pressures. With flow limiting DVV 30 and secondary regulator 26 both closed, further extraction of bleed air from compressor section 16 ceases or is at least significantly reduced. In this manner, the overpressure shutoff of flow limiting DVV 30 will interrupt the continual venting of bleed air from compressor section 16 to low pressure source 50 should there occur excessive leakage across high pressure regulator 24. This, in turn, results in better preservation of the A/C energy content and a boost in the overall efficiency of GTE 12. Overpressure shutoff of DVV 30 also reduces the thermal exposure of high pressure regulator 24 and those components downstream thereof, such as precooler 42, to prolong the operational lifespan and enhance the reliability of these components. As a still further benefit, the overpressure shutoff of flow limiting DVV 30 and the subsequent closing of secondary pressure regulator 26 will tend to generate a pronounced spike in BAS duct pressure, which serves as a distinct hard fault signal readily detected by a non-illustrated pressure sensor included within BAS 10 for diagnostic and maintenance purposes.

An example of one manner in which flow limiting DVV 30 can be implemented will now be described in conjunction with FIGS. 2-4. As a point of emphasis, the following description is provided by way of non-limiting example only. Flow limiting DVV 30 can assume other forms and may include various other structural features in further embodiments providing that the flow limiting duct vent valve: (i) automatically opens at a predetermined minimum pressure differential to provide the desired venting function, and (ii) automatically closes at predetermined maximum pressure differential to provide the desired overpressure shutoff functionality. Flow limiting DVV 30 is described below in conjunction with BAS 10 to provide a convenient, albeit non-limiting exemplary context in which DVV 30 can be better understood. In further embodiments, flow limiting DVV 30 can be utilized in conjunction with other types of bleed air systems, which may differ relative to the illustrated bleed air system 10 to varying extents.

Figure 2:
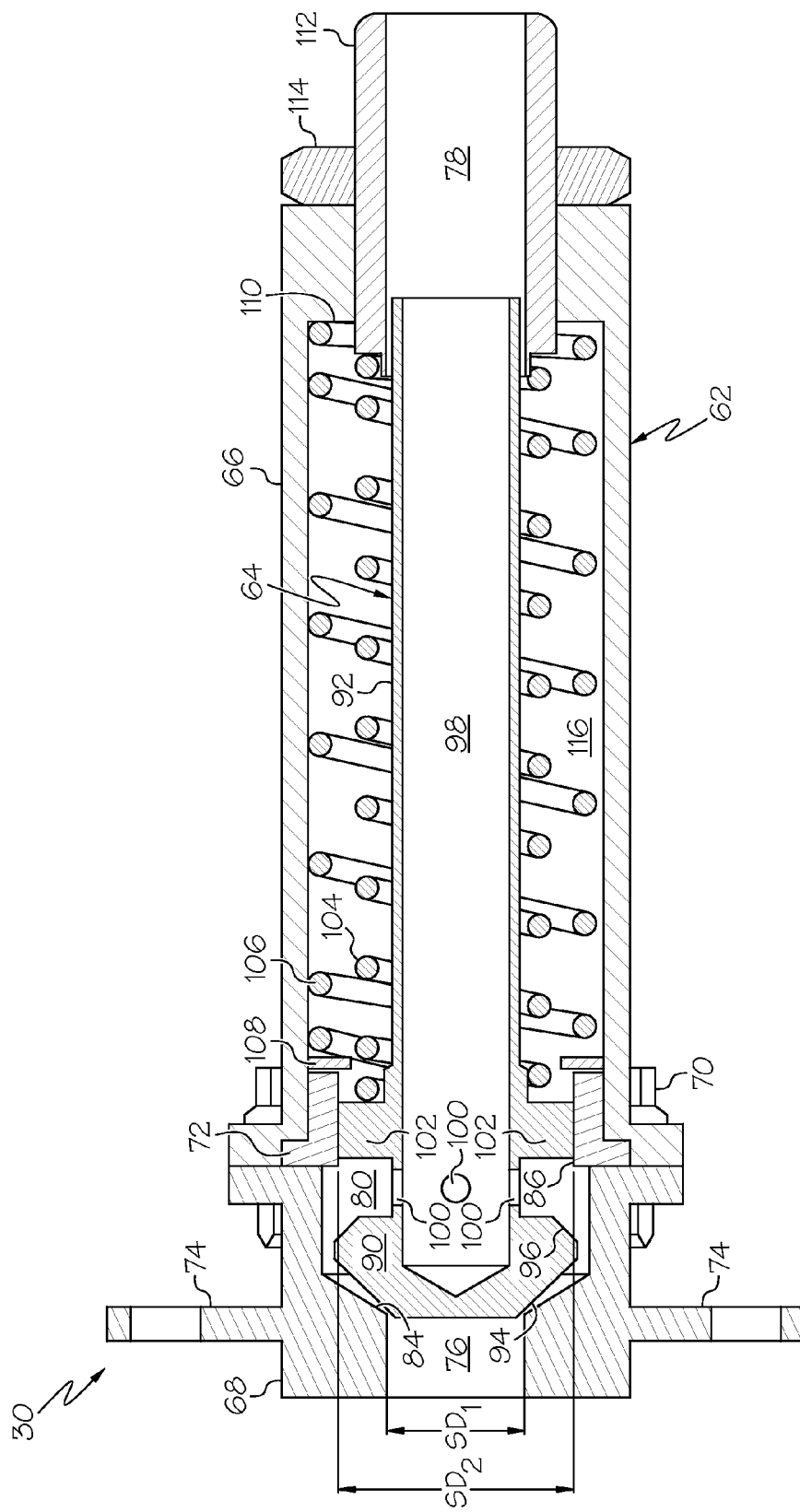
FIG. 2 is a cross-sectional view of a flow limiting duct vent valve suitable for usage as the duct vent valve shown in FIG. 1, as illustrated in accordance with an exemplary embodiment of the present invention.

FIG. 2 is a cross-sectional view of flowing limiting DVV 30 illustrating an exemplary manner in which the flow liming duct vent valve can be implemented. Flow limiting DVV 30 is shown in a closed position in FIG. 2 and is further illustrated in FIGS. 3 and 4 in open vent and overpressure shutoff positions, respectively. Referring collectively to FIGS. 2-4, flow limiting DVV 30 includes a housing assembly 62 containing a valve element 64. Housing assembly 62 can be assembled or otherwise produced from any number of discrete housing pieces or components. In the illustrated example, housing assembly 62 includes an elongated tubular housing piece 66 to which an end cap 68 is attached utilizing a plurality of bolts 70. An annular housing insert 72 is further within tubular housing piece 66. Annular housing insert 72 may include a flange, which is captured between end cap 68 and the abutting end of tubular housing piece 66 when flow limiting DVV 30 is assembled. If desired, annular housing insert 72 may also be secured to tubular housing piece 66 utilizing, for example, a threaded interface.

Figure 3:
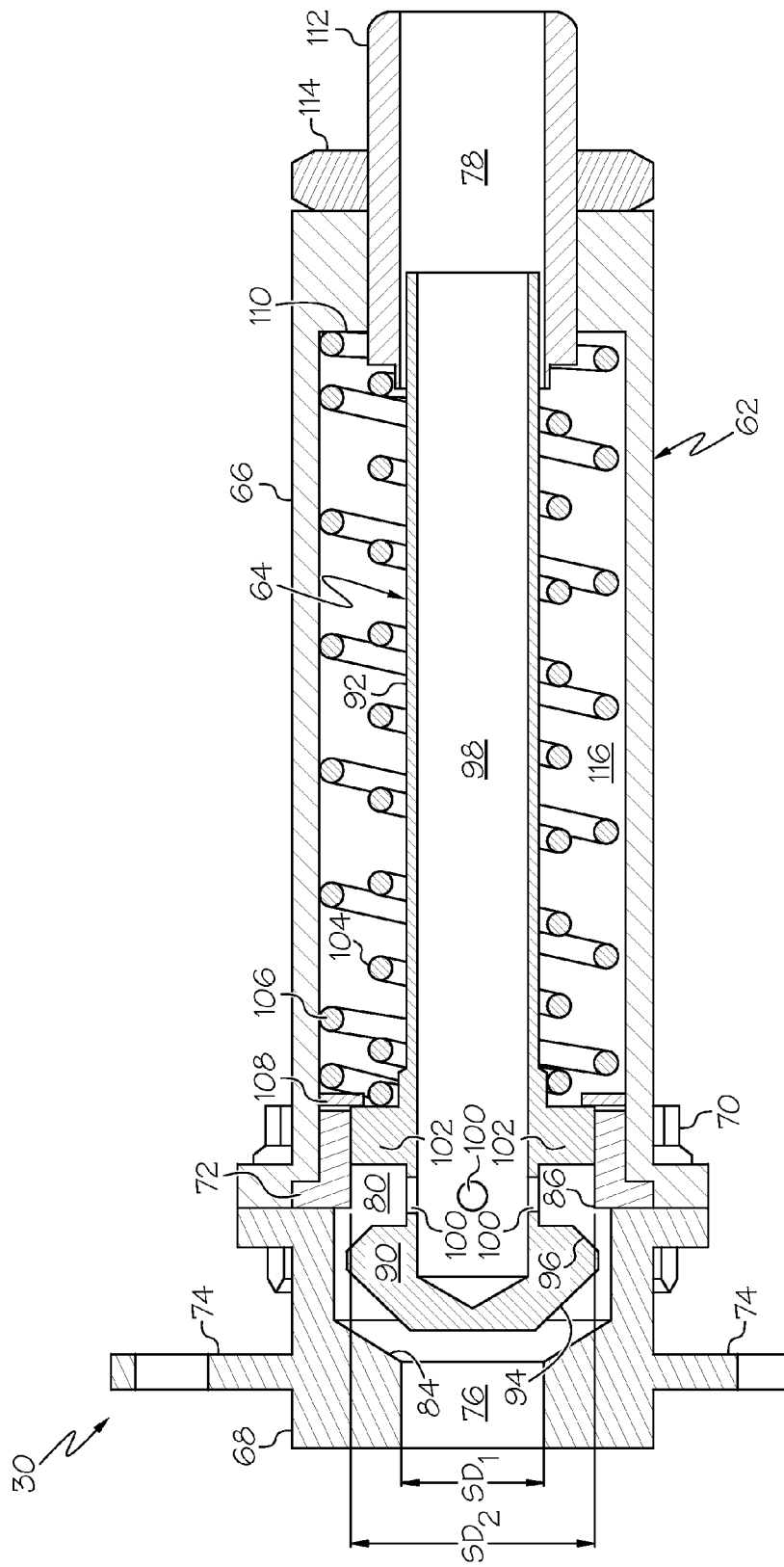
FIGS. 3 and 4 are cross-sectional views of the flow limiting duct vent valve shown in FIG. 1 further illustrated in an open vent and overpressure shutoff positions, respectively.
Figure 4:
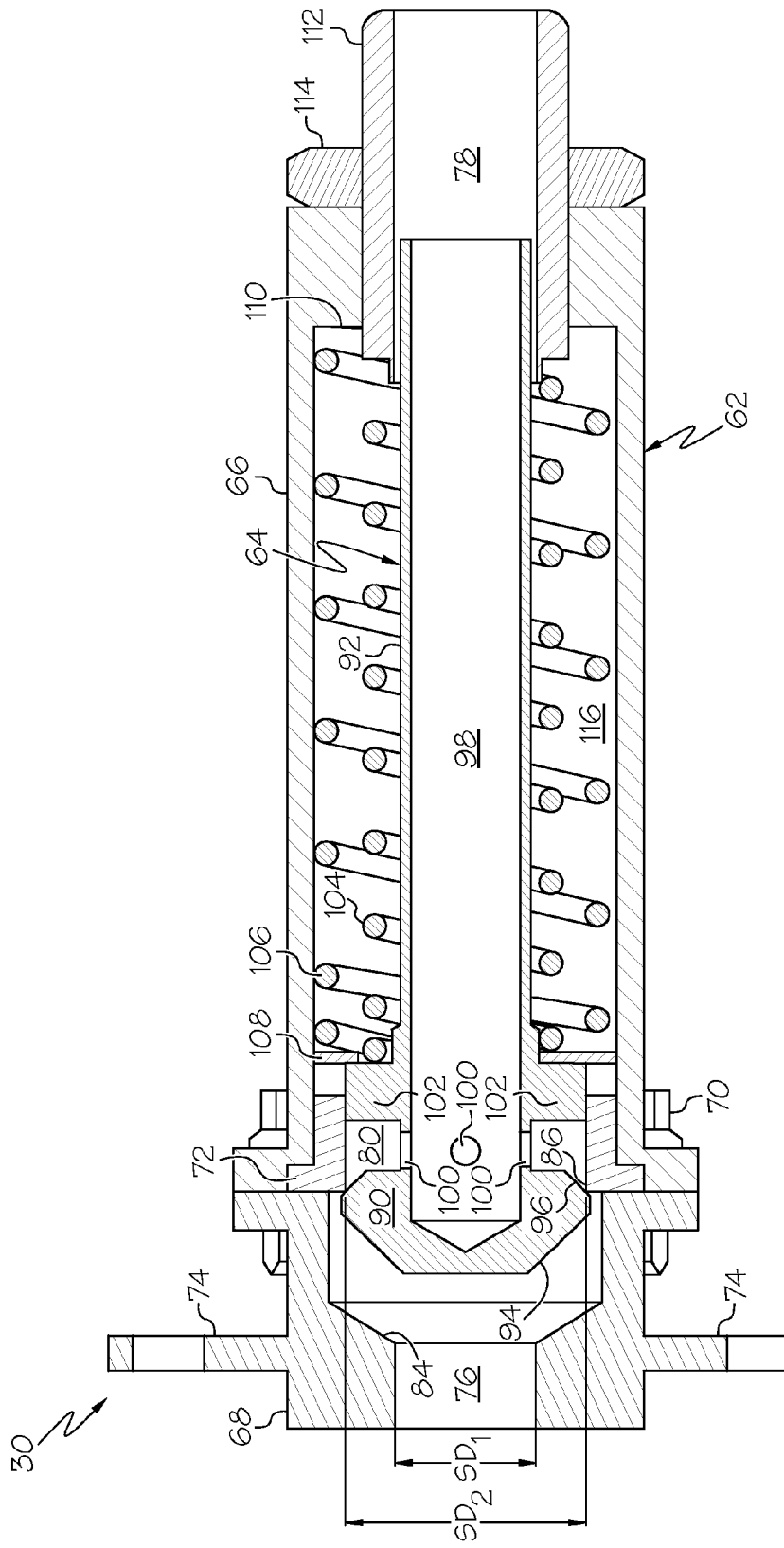

A flange 74 surrounds and projects radially from a first end of tubular housing piece 66 (the left end of housing piece 66 in the orientation shown in FIGS. 2-4). When flow limiting DVV 30 is installed on a gas turbine engine, such as GTE 12 shown in FIG. 1, flange 74 may be bolted or otherwise attached to a mating structure or mounting interface external to engine case 20, such as Y-duct 36 (FIG. 1). Here, it should be noted that the major components of BAS 10 can be distributed as a kit, which is installed on a gas turbine engine by a third party purchaser. Such a kit may contain, for example, flow limiting DVV 30 and the other BAS valves or valved devices (e.g., high pressure regulator 24, secondary regulator 26, and check valve 28) as discrete components, which are then installed at different mounting locations on GTE 12 to deploy the bleed air system. In further embodiments, flow limiting DVV 30 can be marketed and distributed apart from the other components of BAS 10 as a retrofit device, which can be utilized to replace a conventional DVV already deployed on a preexisting BAS.

An inlet 76 is provided in the first end of housing assembly 62, and an outlet 78 is provided in a second, opposing end of housing assembly 62. Additionally, an inlet chamber 80 is formed within housing assembly 62 between inlet 76 and outlet 78. Inlet chamber 80 may house the enlarged poppet head of valve element 64 in embodiments wherein element 64 is a poppet, as described below. First and second valve seats 84 and 86 are further provided within inlet chamber 80. More specifically, a first valve seat 84 is provided adjacent inlet 76 on an interior surface of annular housing insert 72. This valve seat has a conical geometry in the exemplary embodiment shown in FIGS. 2-4 and is referred to hereafter as "inlet seat 84." Conversely, an annular valve seat 86 is located within chamber 80 opposite inlet seat 84 and provided on the inner terminal end of elongated tubular sleeve 78. This valve seat has a cylindrical geometry in the illustrated example and is referred to hereafter as "shutoff seat 86."

In the exemplary embodiment shown in FIGS. 2-4, valve element 64 is a poppet-type valve element and is consequently referred to hereafter as "poppet 64." Poppet 64 includes an enlarged poppet head 90 and an elongated poppet shaft 92, which is fixedly coupled to and projects axially from poppet head 90 in a direction opposite inlet 76. Poppet head 90 and poppet shaft 92 can be fabricated as a single (e.g., machined) piece, although this is not necessary in all embodiments. Poppet head 90 is dual sided or two faced. In this regard, poppet head 90 includes a first face 94, which contacts inlet seat 84 when flow limiting DVV 30 is in the closed position shown in FIG. 2; and a second, opposing face 96, which contacts shutoff seat 86 when DVV 30 is in overpressure shutoff position shown in FIG. 4. Opposing faces 94 and 96 of poppet head 90 can each be imparted with a conical geometry. A central channel 98 (e.g., a bore) is formed in poppet 64. Central channel extends into poppet 64 from a first end of poppet shaft 92 opposite poppet head 90, extends through poppet shaft 92, and terminates within poppet head 90. A plurality of radial openings 100 (e.g., cross-bores) are further drilled into or otherwise formed in poppet shaft 92 to provide fluid communication between inlet chamber 80 and channel 98 when poppet 64 resides in the closed position (FIG. 2) or in an open vent position, such as the open vent position shown in FIG. 3. Radial openings 100 can be formed in poppet shaft 92 at a location adjacent poppet head 90 and, perhaps, at a location between poppet head 90 and an annular protrusion or collar 102 provided around poppet shaft 92. Collectively, channel 98 and radial openings 100 and cooperate to form a flow passage 98, 100 through poppet 64. Flow passage 98, 100 fluidly couples inlet 76 and inlet chamber 80 to outlet 78 when poppet 64 resides in an open vent position.

Primary and secondary compression springs 104 and 106 are further contained within housing assembly 62 and disposed around elongated poppet shaft 92. Primary compression spring 104 is nested with secondary compression spring 106, each of which is substantially coaxially with the longitudinal axis or centerline of flow limiting DVV 30. Secondary compression spring 106 is compressed between a spring seat 108 (e.g., a washer) and an internal wall 110 of elongated housing piece 66. By comparison, primary compression spring 104 is compressed between collar 102 and a preload adjustment feature 112. Primary compression spring 104 exerts a resilient preload force on poppet 64 when poppet 64 is in the closed position shown in FIG. 2 to help set the pressure differential at which flow limiting DVV 30 initially opens or "cracks." Secondary compression spring 106 is engaged by poppet 64 through spring seat 108 as poppet 64 strokes toward outlet 78 (to the right in FIGS. 2-4) to increase the pressure range over which flow limiting DVV 30 will remain in an open vent position (FIG. 3) prior to transitioning into the overpressure shutoff position shown in FIG. 3, as described below.

Preload adjustment feature 112 can be realized as an adjustment screw, which matingly engages a threaded opening provided in the second end of elongated housing piece 66. Preload adjustment feature 112 can be turned to adjust the degree to which primary spring 104 is compressed in the closed position (FIG. 4), to modify the preload force exerted on poppet 64 by spring 104, and to thereby fine tune the pressure differential at which flow limiting DVV 30 initially opens or cracks. Preload adjustment feature 112 has a central channel through which pressurized air flows when flow limiting DVV 30 is in an open vent position. Additionally, the channel of preload adjustment feature 112 is matingly or conformally engaged by the end portion of poppet shaft 92 opposite poppet head 90 to provide a linear guide feature constraining movement of poppet 64 to sliding or translational movement along the centerline or longitudinal axis of DVV 30. A lock nut 114 is further threaded onto preload adjustment feature 112 and tightened against the second end of tubular housing piece 66 to prevent back driving of feature 112. If further embodiments, flow limiting DVV 30 can lack such a preload adjustment feature or a different approach (e.g., the insertion of shims into housing assembly 62) can be utilized to adjust the preload force of springs 104 and 106. Elimination of preload adjustment feature 112 may be desirable to, for example, facilitate attachment of a fitting or tubing to housing assembly 62 at the location of feature 112.

As indicated above, flow limiting DVV 30 automatically or independently opens at a predetermined minimum pressure differential (referred to below as the "minimum vent $\Delta P$") to provide the desired venting functionality. Additionally, flow limiting DVV 30 automatically or independently closes at predetermined maximum pressure differential (referred to below as the "maximum vent $\Delta P$") to provide an overpressure shutoff functionality. Flow limiting DVV 30 transitions between the closed position (FIG. 2), the open position range (e.g., the position shown in FIG. 3), and the shutoff position (FIG. 4) in response to the pressure within Y-duct 36 (FIG. 1) and the corresponding pressure differential across poppet 64. The mechanism by which flow limiting DVV 30 and, more specifically, poppet 64 transitions between these positions will now be described. Referring initially to the closed position shown in FIG. 2, flow liming DVV 30 and poppet 64 reside in the closed position prior to start-up of GTE 12 (FIG. 1) when the pressure within Y-duct 36 is relatively low and the pressure differential across poppet 64 is minimal or non-existent. Under such conditions, poppet 64 and, more generally, DVV 30 is maintained in the closed position (FIG. 2) by the preload force of primary compression spring 104 exerted on poppet 64 through collar 102.

At some juncture after GTE 12 start-up, the pressure differential across poppet 64 increases due, at least in part, to rising pressures within Y-duct 36. When the pressure differential across poppet 64 surpasses the minimum vent $\Delta P$, the net force applied on poppet 64 in the direction of outlet 78 (to the right in FIGS. 2-4) increases to a level sufficient to overcome the preload force exerted on poppet 64 by primary compression spring 104. Spring 104 thus compresses, poppet 64 slides away from inlet 76 (to the right in FIGS. 2-4), and poppet face 94 lifts from inlet seat 84. Poppet 64 thus moves into an initially opened or cracked position, which may be slightly to the left of the open vent position shown in FIG. 3. Poppet 64 may further translate through a range of open vent positions in response to pressure fluctuations within Y-duct 36, providing that such pressure fluctuations remain within an acceptable range. When poppet 64 initially moves into an opened or cracked position, secondary compression spring 106 remains mechanically disengaged from poppet 64; that is, spring 106 does not exert a resilient bias force on poppet 64. However, as poppet 64 strokes further toward the overpressure shutoff position (to the right in FIGS. 2-4), collar 102 of poppet 64 contacts spring seat 108 to engage poppet 64 and secondary compression spring 106. After collar 102 contacts spring seat 108, secondary compression spring 106 acts in parallel with primary compression spring 104 to resist further sliding movement of poppet 64 toward the overpressure shutoff position. In this manner, compression springs 104 and 106 cooperate to increase the pressure range over which poppet 64 and, more generally, flow limiting DVV 30 will remain in an open vent position before transitioning into the overpressure shutoff position shown in FIG. 4.

When flow limiting DVV 30 is in an open vent position, such as that shown in FIG. 3, pressurized air enters inlet chamber 80 through inlet 76; flows through poppet 64 via flow passage 98, 100; and ultimately exits DVV 30 through outlet 78. Outlet 78 can discharge the pressurized airflow directly into the interior of the nacelle, direct the pressurized airflow into a conduit (e.g., a tubing) that subsequently discharges the airflow overboard, or otherwise assist in delivering the airflow to low pressure source 50 (FIG. 1). By selectively opening in this manner, flow liming DVV 30 vents high pressure airflow to low pressure source 50 (FIG. 1) to prevent the pressure within Y-duct 36 from becoming undesirably high. Notably, springs 104 and 106 are contained within a tubular spring cavity 116, which is bounded by the outer circumferential surface of poppet shaft 92 and the inner circumferential surface of tubular housing piece 66. Spring cavity 116 is fluidly isolated from inlet chamber 80 by spring seat 108 and by the close fitting relationship between collar 102 and annular housing insert 72. Compression springs 104 and 106 are thus substantially shielded or fluidly isolated from the hot, pressurized air flowing through DVV 30 when open. As a result, heating of springs 104 and 106 is minimized to ease the spring temperature requirements and to provide a more consistent spring rate across a wide temperature range. Additionally, the axially-elongated geometry of cavity 116 allows the usage of relatively long compression springs as springs 104 and 106, which may also help to provide a relatively low spring rate. In one embodiment, the length of springs 104 and 106 may each be greater than one half the length of flow limiting DVV 30, as taken along the centerline or longitudinal axis of DVV 30.

As the pressure within Y-duct 36 increases, so too does the pressure differential across poppet 64. Poppet 64 moves into the overpressure shutoff position (FIG. 4) when the pressure differential across poppet 64 surpasses the maximum vent ΔP; that is, the pressure differential at which the force exerted on poppet 64 by the pressurized airflow through DVV 30 is sufficient to overcome the resilient bias force exerted on poppet 64 by compression springs 104 and 106. To transition into the overpressure shutoff position (FIG. 4) from the open vent position (FIG. 3), poppet 64 slides further towards outlet 78 (to the right in FIGS. 2-4) bringing face 96 of poppet head 90 into contact with shutoff seat 86. High pressure airflow through flow limiting DVV 30 is thus blocked or significantly impeded to prevent further venting of airflow from Y-duct 36 (FIG. 1). Notably, inlet seat 84 thus has a decreased surface areas as compared to shutoff seat 86. In particular, and as labeled in FIG. 1, the average diameter of inlet seat 84 (identified by double-headed arrow "$DS_1$") is less than the average diameter of shutoff seat 86 (identified by double-headed arrow "$DS_2$"). Poppet 64 will consequently return to an open vent position from the overpressure shutoff position (FIG. 4) at a pressure differential (referred to herein as the "overpressure reset ΔP") lower than the pressure differential required to initially crack DVV 30 (the "minimum vent ΔP"). This, in effect, imparts DVV 30 with a latching effect, which reduces the tendency of poppet 64 to fluctuate or "hum" against shutoff seat 86, increases poppet stability, and reduces the likelihood of sending undesired pressure pulses throughout the system. The particular values of the minimum vent ΔP, the maximum vent ΔP, and the overpressure reset ΔP will vary amongst embodiments and in conjunction with preload force exerted on poppet 64 by spring 104. However, by way of non-limiting example, the minimum vent ΔP, the maximum vent ΔP, and the overpressure return ΔP can be 150±50 pounds per square inch (psi), 175±50 psi, and 100 psi±50 psi, respectively; while the overpressure reset ΔP<the minimum vent ΔP<the maximum vent ΔP.

The foregoing has thus provided embodiments of a BAS containing a flow limiting DVV having an unique overpressure shutoff functionality. Through the provision of such an overpressure shutoff functionality, embodiments of the flow limiting DVV can improve GTE efficiency by preventing or at least reducing the continual parasitic extraction of hot, pressurized air from the GTE compressor section when, for example, excess leakage occurs across a high pressure regulator. The overpressure shutoff of the flow limiting DVV can also minimize the heat exposure of the high pressure regulator and downstream components (e.g., precoolers) to prolong service life and enhance reliability of such components. The overpressure shutoff of the flow limiting DVV aids in the identification and diagnosis of BAS system faults. As a still further advantage, embodiments of the above-described limiting duct vent valve are relatively lightweight, compact, and durable. While described above in the context of a particular exemplary BAS, embodiments of the flow limiting DVV can be utilized in other fluid-conducting systems in which it is desired to provide both duct pressure relief and overpressure shutoff functionalities. Furthermore, the flow limiting DVV can be employed within bleed air systems that differ in structure, layout, and contained components as compared to the exemplary bleed air systems described above. For example, in further embodiments, the flow limiting DVV can be utilized within a bleed air system containing a valve or valved device other than a high pressure regulator upstream of the DVV and downstream of a GTE compressor bleed port, such as a high stage bleed port.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended claims.

What is claimed is:

1. A bleed air system for installation on a gas turbine engine, the bleed air system comprising:
   a first valved device; and a flow limiting Duct Vent Valve (DVV), comprising:
- a housing assembly having an inlet and an outlet, the inlet fluidly coupled to the first valved device when the bleed air system is installed on the gas turbine engine;
- a poppet slidably mounted in the housing assembly and normally residing in a closed position, the poppet moving from: (i) the closed position to an open vent position when a pressure differential across the valve element exceeds a first threshold, and (ii) from the open vent position to an overpressure shutoff position when the pressure differential across the valve element exceeds a second threshold greater than the first threshold;
- a first spring disposed within the housing assembly and biasing the poppet toward the closed position when the poppet is in the closed position; and
- a second spring disposed within the housing assembly, mechanically disengaged from the poppet in the closed position, and engaging the poppet to act in parallel with the first spring as the poppet moves toward the overpressure shutoff position.

2. The bleed air system of claim 1 wherein the first valved device comprises a high pressure regulator.

3. The bleed air system of claim 2 further comprising a secondary regulator, the flow limiting DVV fluidly coupled between an outlet of the high pressure regulator and an inlet of the secondary regulator when the bleed air system is installed on the gas turbine engine.

4. The bleed air system of claim 1 wherein the poppet comprises:
- a poppet head having a first face and a second, opposing face; and
- an elongated poppet shaft extending from the poppet head.

5. The bleed air system of claim 4 wherein the flow limiting DVV further comprises:
- an inlet seat within the housing assembly and contacted by the first face when the poppet is in the closed position; and
- a shutoff seat within the housing assembly and contacted by the second, opposing face when the poppet is in the overpressure shutoff position.

6. The bleed air system of claim 5 wherein the inlet seat has a first diameter, and wherein the shutoff seat has a second diameter greater than the first diameter.

7. The bleed air system of claim 1 further comprising a spring cavity in which the first spring and the second spring are located, the spring cavity partially defined by an outer circumferential surface of the poppet and fluidly isolated from air flowing through the flow limiting DVV when the poppet is in the open vent position.

8. The bleed air system of claim 1 further comprising a flow passage formed in the poppet and through which air passes when flowing from the inlet to the outlet.

9. The bleed air system of claim 1 wherein the poppet further moves from the overpressure shutoff position to the open vent position when the pressure differential across the valve element falls below a third threshold less than the first threshold.

10. The flow limiting DVV of claim 1 further comprising a duct fluidly coupling the first valved device to the flow limiting DVV; and
wherein, when in the overpressure shutoff position, the poppet blocks airflow through the flow limiting DVV to prevent additional venting of airflow from the duct when the pressure differential across the valve element exceeds the second threshold.

11. The flow limiting DVV of claim 1 further comprising a spring seat contained in the housing assembly and configured to slide therein, the spring seat contacting the second spring;
wherein the second spring engages the poppet through the spring seat as the poppet moves toward the overpressure shutoff position.

12. The flow limiting DVV of claim 1 wherein the first spring is substantially coaxial with and is nested within the second spring.

13. A flow limiting Duct Vent Valve (DVV), comprising:
a housing assembly having an inlet and an outlet
a valve element slidably mounted in the housing assembly and normally residing in a closed position, the valve element moving from: (i) the closed position to an open vent position when a pressure differential across the valve element surpasses a first threshold, and (ii) from the open vent position to an overpressure shutoff position when the pressure differential across the valve element surpasses a second threshold greater than the first threshold;
a first spring disposed within the housing assembly and biasing the valve element toward the closed position when the valve element is in the closed position; and
a second spring disposed within the housing assembly, mechanically disengaged from the valve element in the closed position, and engaging the valve element to act in parallel with the first spring as the valve element moves toward the overpressure shutoff position.

14. The flow limiting DVV of claim 13 wherein the valve element-comprises:
a dual faced poppet head; and
an elongated poppet shaft extending from the dual faced poppet head in a direction opposite the inlet.

15. The flow limiting DVV of claim 14 further comprising a flow passage extending through the elongated poppet shaft and through which pressurized air flows when the poppet is in the open vent position.

16. The flow limiting DVV of claim 14 further comprising:
an inlet seat contacted by a first face of the dual faced poppet head in the closed position; and
a shutoff seat contacted by a second, opposing face of the dual faced poppet head in the overpressure shutoff position.

17. The flow limiting DVV of claim 16 wherein the inlet seat has a first diameter, and wherein the shutoff seat has a second diameter greater than the first diameter.

* * * * *